United States Patent [19]
Alperovich et al.

[11] Patent Number: 5,781,628
[45] Date of Patent: Jul. 14, 1998

[54] SYSTEM AND METHOD FOR SELECTIVE RESTRICTION OF CIPHERING

[75] Inventors: Vladimir Alperovich, Dallas; Eric Valentine, Plano, both of Tex.

[73] Assignee: Ericsson Inc., Research Triangle Park, N.C.

[21] Appl. No.: 914,563

[22] Filed: Aug. 19, 1997

[51] Int. Cl.$^6$ .................................................. H04L 9/00
[52] U.S. Cl. ................................ 380/9; 380/49; 380/59
[58] Field of Search ........................ 380/9, 20, 21, 380/28, 29, 49, 50, 59, 34, 48, 45

[56] References Cited

U.S. PATENT DOCUMENTS

| | | | |
|---|---|---|---|
| 5,159,634 | 10/1992 | Reeds, III | 380/28 X |
| 5,172,414 | 12/1992 | Reeds, III et al. | 380/45 |
| 5,235,614 | 8/1993 | Bruckert et al. | 380/34 X |
| 5,392,357 | 2/1995 | Bulfer et al. | 380/9 X |
| 5,434,920 | 7/1995 | Cox et al. | 380/49 |
| 5,455,861 | 10/1995 | Faucher et al. | 380/9 |
| 5,528,693 | 6/1996 | Leopold | 380/48 |
| 5,594,798 | 1/1997 | Cox et al. | 380/49 |

*Primary Examiner*—Bernarr E. Gregory
*Attorney, Agent, or Firm*—Jenken & Gilchrist

[57] ABSTRACT

A system and method for selectively restricting wireless ciphering communications within a telecommunications system is disclosed. A ciphering database contains flags corresponding to the ciphering restrictions on particular geographical areas. After consulting the particular flag for an area, a ciphering mode is determined either restricting ciphering or allowing it within that geographical or geopolitical area.

44 Claims, 5 Drawing Sheets

5,781,628

SYSTEM AND METHOD FOR SELECTIVE RESTRICTION OF CIPHERING

BACKGROUND OF THE PRESENT INVENTION

1 Field of the Invention

The present invention relates generally to a telecommunications system and method for selectively restricting wireless ciphering capability within the telecommunications system, particularly to a system and method for selectively restricting ciphering for a given wireless communication within a ciphering-free zone.

2 Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

With reference now to FIG. 1 of the drawings, there is illustrated a Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls that LA 18. Each Location Area 12 is divided into a number of cells 22. Mobile Station (MS) 20 is the physical equipment, e.g., a car phone or other portable phone, used by mobile subscribers to communicate with the cellular network 10, each other and users outside the subscribed network, both wireline and wireless.

The MSC 14 is in communication with at least one Base Station Controller (BSC) 23, which, in turn, is in contact with at least one transceiving Base Station (BS) 24, which is the physical equipment, illustrated for simplicity as a radio tower, that provides radio coverage to the geographical area of the cell 22 in which to handle radio traffic to and from the MS 20. It should be understood that the BSC 23 may be connected to several base stations 24 and may be implemented as a stand-alone node or as integrated with the MSC 14. In either event the BSC 23 and BS 24 components, as a whole, are generally referred to as a Base Station System (BSS) 25, operating within the BSS area 25 as also illustrated in FIG. 4.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, an integral part of the MSC 14 or service multiple MSCs 14, the latter of which is illustrated in FIG. 1.

The VLR 16 is a database containing information about all of the mobile stations 20 currently located within the MSC/VLR area 12. If a mobile station 20 roams into a new MSC/VLR area 12, the VLR 16 connected to that MSC 14 will request data about that mobile station 20 from the HLR database 26 (simultaneously informing the HLR 26 about the current location of the mobile station 20). Accordingly, if the user of the mobile station 20 then wants to make a call, the local VLR 16 will have the requisite identification information without having to reinterrogate the HLR 26. In the aforedescribed manner, the VLR and HLR databases 16 and 26, respectively, contain various subscriber information associated with a given mobile station 20.

It should be understood that the above system 10, illustrated in FIG. 1, is a terrestrially-based network, e.g., one based upon the Global System for Mobile (GSM) communications standard. One of the advantages of such systems 10 is the availability of ciphering, i.e., encryption, to protect user privacy by ciphering transmission over the air interface, e.g., between the respective mobile stations 20 and base stations 24, as well as over other wireless or wireline links to a desired remote party. Some legal authorities, however, forbid such ciphering within their jurisdiction, and want to be able to more easily perform lawfully authorized signal interception. For example, the country of France, in an effort to monitor terrorist activities, forbids encryption, e.g., using the A5/1 or A5/2 standards, within its borders.

Since the aforedescribed cellular systems 10 typically lay within rather than across jurisdictions, a given system 10 is generally able to enable or disable ciphering based upon the particular regulations of the governing jurisdiction. Further, since the range of a particular transmission component of the cellular system 10, e.g., an MS 20 or the BS 24, is geographically limited, the controlling MSC 14, BSC 23 or BS 24 is able to turn this feature on and off if such jurisdictional prohibitions apply to areas within a particular cellular system 10, which border or extend into an encryption-free zone. By selectively restricting encryption (or other features) to some jurisdictions, while allowing it others, a cellular system could better comply with the laws of the more restrictive nearby jurisdiction.

Such geographical or geopolitical restrictions, however, are much more problematic for satellite-based systems, as shown in FIG. 2 (and in FIG. 5) which may cast a large extraterritorial transmission footprint over numerous distinct countries or other jurisdictions, e.g., States, some of which permit encrypted transmission and some which do not. As illustrated in FIG. 2, for example, a satellite 28 orbiting the earth above Europe may transmit over a large geographical area, indicated by circle 30, covering several different countries, e.g., parts of England, France and Belgium. Land-earth stations 32 within a satellite-based telecommunications system 29 (illustrated in FIG. 5), corresponding to the base stations 24 in cellular system 10, coordinate communications to and from the satellite 28 and the respective local systems servicing the populace, e.g., other cellular systems 10 attached to the satellite-based system 29.

It is, accordingly, an object of the present invention to provide a system and method for providing selective restrictions on encryption or other ciphering within a cellular or satellite-base system.

It is also an object of the present invention to provide a system and method for denying encryption or ciphering to cellular or satellite-base system users dwelling within geopolitical areas forbidding such encoding, and allowing such encoding in geopolitical areas permitting it.

It is, therefore, an object of the present invention to provide a system and method to provide encryption and other ciphering to cellular or satellite-based system subscribers in accordance with the laws of the jurisdictions covered by those systems.

SUMMARY OF THE INVENTION

The present invention is directed to a system and method for selectively restricting wireless ciphering communications within a telecommunications system. A ciphering database contains flags corresponding to the ciphering restrictions on particular geographical areas. After consulting the particular flag for an area, a ciphering mode is determined either restricting ciphering or allowing it within that geographical or geopolitical area.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
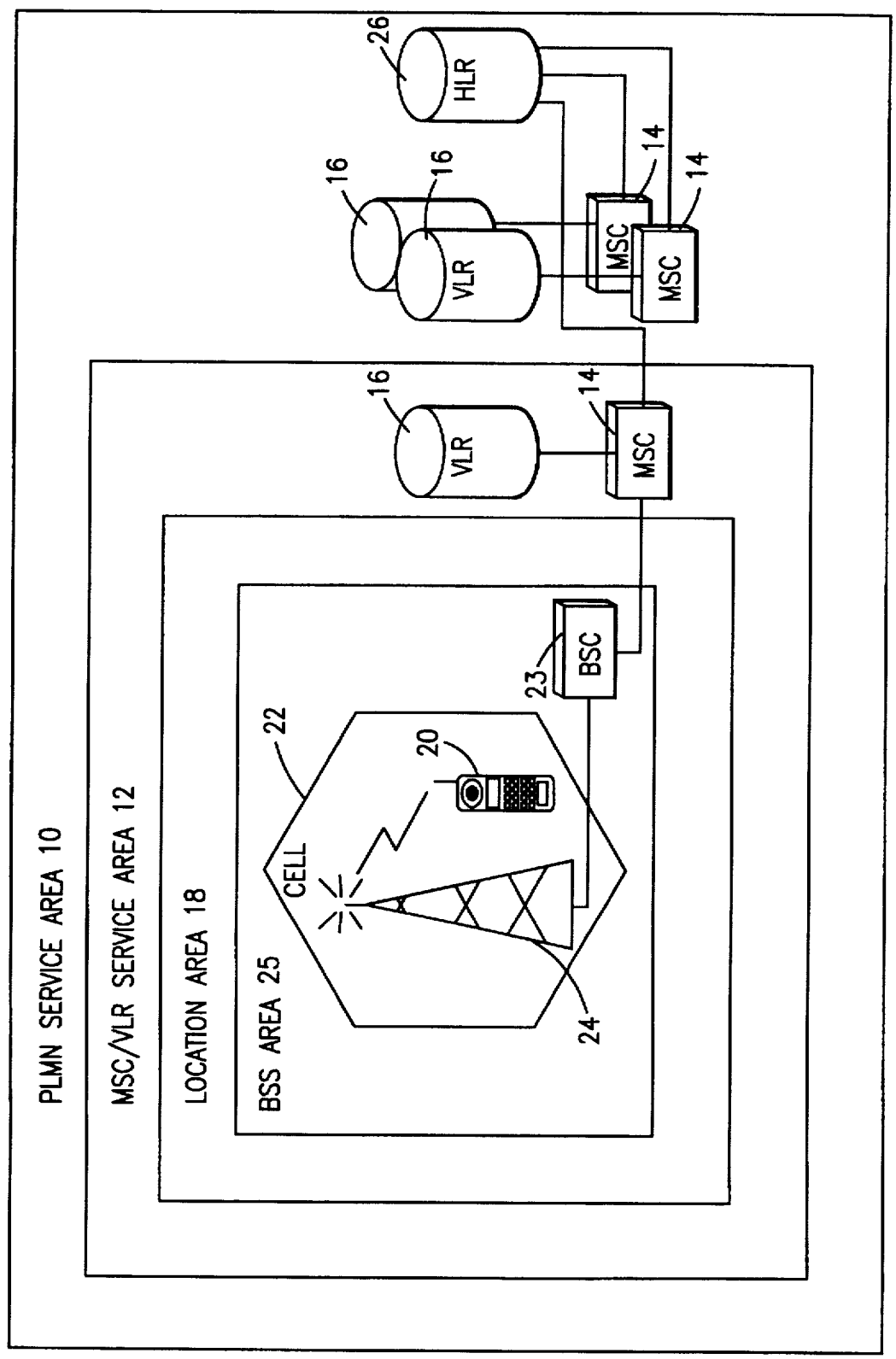
FIG. 1 is a block diagram of a conventional terrestrially-based telecommunications system such as may be employed in practicing the system and method of the present invention.

With reference again to FIG. 2, it is clear that there is a need for a system and method to ascertain and handle signal restrictions that may arise within the various geopolitical areas of coverage of the satellite 28, as well as restrictions within the areas of coverage of the cellular system 10 shown in FIG. 1, particularly encryption restrictions.

In accordance with a preferred embodiment of the present invention, a mapping function is utilized which includes a database of the restrictions keyed to the pertinent geographical or geopolitical areas. The reported or calculated position of a given signal is used as a database key, for example, x and y coordinates may indicate the position of a particular user or telecommunications system within a transborder cellular system 10 or a satellite-based system, such as employing the satellite 28.

Figure 4:
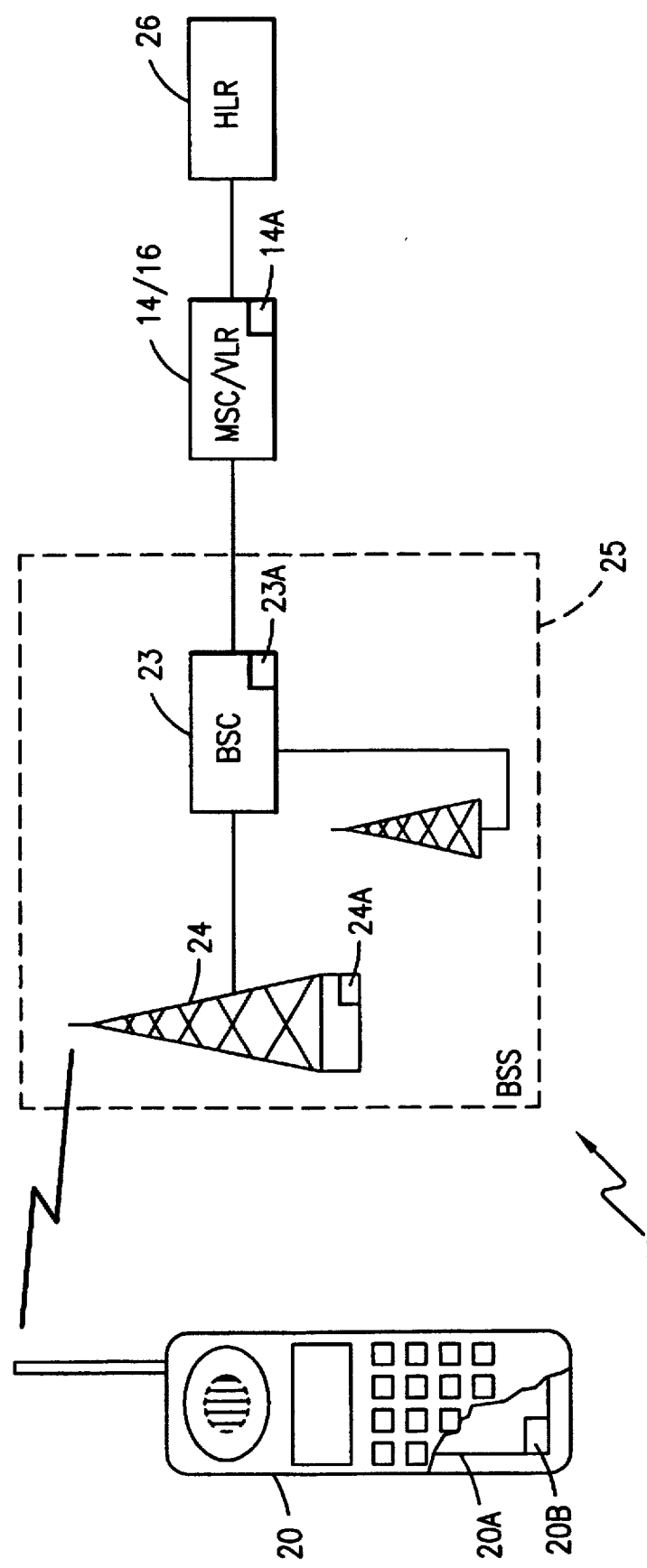
FIG. 4 is a block diagram of a system for implementing ciphering restriction in a terrestrially-based cellular system, such as illustrated in FIG. 1.

It should be understood that other positional indicators may be used provided sufficient geographical and geopolitical resolution or granularity is maintained in order to unambiguously reference information about a particular position on the earth. It should further be understood that the indicator or key need not point out the jurisdiction itself, but may instead point to a subarea therein. For example, location may be ascertained to a great degree upon the particular cell 22 or MSC/VLR Service Area 12 of the call, each cell or area 12 containing an encryption flag as part of the data for that entity, e.g., stored within memories 24A, 23A and 14A within the BS 24, BSC 23 and MSC 14/VLR 16, respectively, as also illustrated in FIG. 4. Alternatively, the BSC 23 may include a list or database of restrictions on the base stations 24 within its domain and the MSC 14/VLR 16 may likewise maintain a database of such restrictions on the base stations 24 and their controllers 23. The mapping function should not, of course, improperly indicate that a jurisdiction has opposing requirements, e.g., indicate that France or a subarea thereof is enabled for ciphering.

A simple database key is to use the x and y coordinates as positional markers within a tabular database of geopolitical points or flags, where a flag being set to one indicates ciphering availability within that pointal area and being at zero indicates nonavailability. For example, the x, y coordinates may indicate latitude, longitude down to the degrees, e.g., 1° latitude, 44° longitude is Bordeaux, France and the pertinent database flag at (1,44) for that global portion is set to zero.

Figure 2:
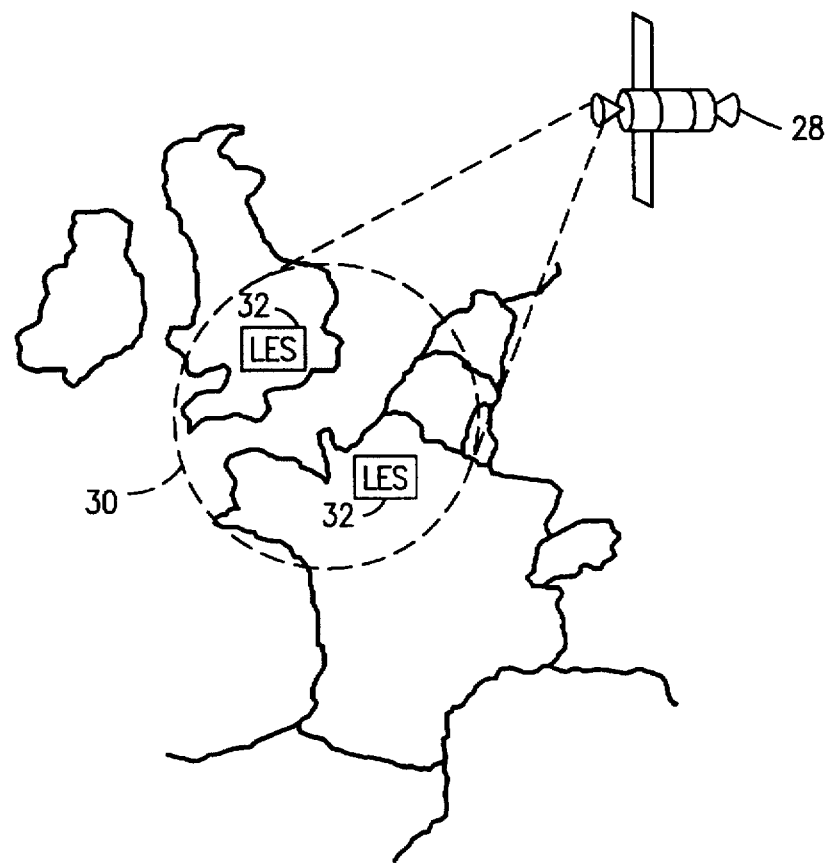
FIG. 2 is a perspective view of a satellite in a satellite-based telecommunications system, the satellite covering several geopolitical areas.
Figure 3:
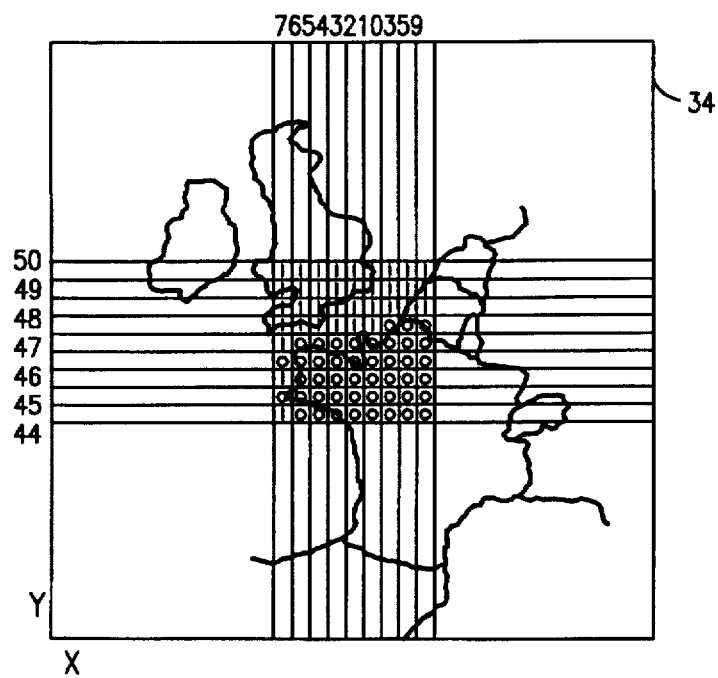
FIG. 3 is a combined view of a tabular database for storing a grid of cipher flags representing the enablement status of ciphering within each grid of the geopolitical areas shown in FIG. 2.

With reference now to FIG. 3, there is shown a database table 34 illustrating the tabularization of a portion of the flags for the areas shown in FIG. 2, in particular, an implementation of the tabular database of geopolitical points where the horizonal (x) coordinate represents the latitude and the vertical (y) coordinate represents the longitude, with the granularity being degree. It should be understood that coarser granularities may be preferred in an effort to limit database size (360×360 degrees). Conversely, finer granularities in minutes, seconds or other subdivision, e.g., at the aforementioned service area 12 or cell 22 level, may be preferred to better define the geopolitical borders between conflicting encryption policy areas, e.g., along the border between France and Belgium in FIGS. 2 and 3 or other contiguous jurisdictions with conflicting ciphering requirements.

It should be understood that the aforedescribed flags within the table 34 may be integers, discrete Boolean flags, a bit within horizontal and/or vertical bit strings, or other numerical or logical representations. In any event, a respective flag represents a discrete portion of the earth corresponding thereto and the mapping function must check the respective flag within the table 34 to determine the availability of encryption for a user within that portion. A ciphering procedure including a Cipher Mode command, discussed further herein, is used to initiate the table 34 lookup, with a Boolean value being returned, e.g., where one represents the availability of legal encryption and zero represents no encryption. A mode flag, also discussed further herein, is then set in accordance with the requirements of that jurisdiction, i.e., if the mode flag is set, restrictions apply, otherwise assume encryption is lawful.

The database table 34 and the mapping functionality or interface associated with it may be placed within various components of either the cellular system 10 or the satellite-based system shown in FIGS. 1 and 2, respectively. Within cellular system 10, for example, the table 34 and the associated interface may be placed, for instance, within the MSC 14 (and associated VLR 16), the BSC 23 or the individual base stations 24 (collectively, the BSC 23 and associated base stations 24 form the aforementioned base station subsystem or BSS 25). Similarly within the satellite-based system shown in FIG. 2, the table 34 and interface may be placed within a Mobile Satellite Switching Center (MSSC) 34 (shown in FIG. 5), corresponding to the MSC 14 in cellular system 10, and the associated VLR 16 or the LES 32.

It should, of course, be understood that the table 34 need not contain ciphering flags for the entire world and subtables may be utilized for various geographical areas, e.g., corresponding to Europe, the Northern hemisphere or other geographical portions of the earth. The table 34 or subtables may be stored within one or more of the aforementioned devices, geographically or geopolitically dividing the earth in accordance with intended usage or for performance enhancement.

For example, equipment, such as the LES 32, in contact with a geostationary satellite, such as satellite 28, over Europe and having a relatively fixed transmission footprint 30 similar to that shown in FIG. 2 would not need the tabular 34 data for geopolitical areas distant from Europe, e.g., China. Accordingly, less memory and fewer computations would be required to determine ciphering availability within such a system. It should, of course, be understood that the various devices could be updated with other table or subtable values should the need arise, e.g., updating the MSC 14 or other equipment whenever a jurisdiction changes its ciphering policy.

In determining ciphering capability for a particular communication, various general steps must be performed to insure compliance within regional or territorial encryption or other restrictions. First, the aforementioned Cipher Mode Command (CMC) must be transferred to initiate a determination of such ciphering capability. The CMC is preferably invoked whenever a jurisdictional or transborder issue might arise, e.g., calls to and from users within more remote areas that may have ciphering restrictions placed upon their communications (and, therefore, the other user as well), handovers, during powerup, etc. In other words, the CMC should be included within numerous data exchange commands, particularly those involving initialization, call setup, handovers, and other exchanges where the status of encryption legality may be unknown.

Second, upon initiation of the CMC, the table 34 database is accessed to ascertain the legality of encryption within a particular locale by obtaining the particular flag value within the table 34, e.g., by use of the latitude, longitude as two-dimensional Cartesian coordinates for both the geographic locale and database indices. The mapping function or interface used returns a Boolean or other flag value associated with the ciphering capability within that locale. Lastly, the transmission mode for that communication is set based upon the flag value obtained, which operates in that mode (encryption permitted/denied) until the communication ends or a subsequent CMC modifies the mode. For example, a Parisian MS 20 user within France who then crosses the Belgium border can thereafter communicate with a Londoner using encryption.

GSM specifications define a number of points in the call where ciphering may be requested, e.g., at initial registration for subscribers desiring all of their conversations encrypted, as a result of location updating, call setup, etc. In implementing the selective geographical restriction method of the present invention, several approaches may be utilized, discussed in more detail hereinbelow.

Figure 6:
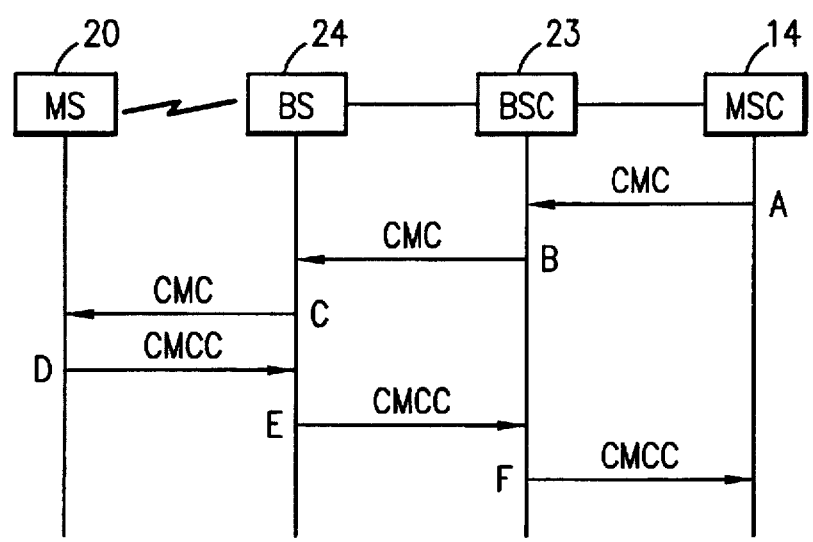
FIG. 6 is a chart illustrating the steps followed in a method of the present invention.

If the table 34 and associated mapping functionality is placed within the BSS 25, i.e., within the BSC 23 and/or one or more of the respective base stations 24 attached thereto, upon receipt of the Cipher Mode Command (CMC) from the MSC 14, the BSS 25 checks the table 34 database to determine if ciphering should be disabled. With reference now to FIG. 6, there is shown an example of this embodiment of the present invention, incorporating the table 34 (and mapping functionality) within a memory 23A within the BSC 23 (shown in FIG. 4).

As shown in FIG. 6, at a point in the call controlled by the operator, e.g., at call establishment, the MSC 14 orders ciphering by sending the CMC signal (step A) to the BSC 23, which accesses table 34 stored within memory 23A therein using the aforementioned coordinates as indices. It should be understood that the aforedescribed coordinates or location are either calculated or reported by the mobile station 20 when the system 10 or 29 was accessed. If ciphering should mode disabled for that communication, a cipher mode flag 36 within the CMC is set to clear, indicating an encryption-free zone. If, however, ciphering is not disabled, the normal process between the MSC 14/VLR 16 to MS 20 is carried out, i.e., encryption permitted is the default.

After determination of the ciphering mode for that communication, i.e., the value of the cipher mode flag 36, the BSC 23 relays that result to the BS 24 (step B) which, in turn, relays the result to the MS 20 (step C), respectively setting mode flags within the memories 23A, 24A and 20A of the BSC 23, BS 24 and MS 20, respectively, to govern the transmission. The MS 20 responds to the CMC with a Ciphering Mode Complete Command (CMCC) to the BS 24 (step D), which, in turn, forwards the CMCC to the BSC 23 (step E), which sends the same command to the MSC 14 (step F).

If the table 34 and associated functionality is instead stored within the BS 24, the MSC 14 forwards the CMC to the BS 24 (steps A and B), at which point the BS 24 checks the table 34, the cipher mode flag 36 within the CMC is adjusted accordingly, and transferred to the MS 20 (step C), which sends the aforedescribed CMCC back (steps D–F). As is understood to those skilled in the art, the set of allowable cipher options is preferably represented as a bit mask within the CMC. If ciphering is disabled, the respective bit field will be set to zero and a "no ciphering" field for the particular device will be set to one.

Where the table 34 and associated mapping functionality is instead housed within the VLR 16, at the point in the call where the Cipher Mode Command (CMC) should be sent, the MSC 14 checks the VLR 16 (which preferably holds the table 34 along with all of the subscriber data) to determine the ciphering requirements for that locale. It should, of course, be understood that the table 34 and associated functionality may instead be stored within the MSC 14 or remotely on another database. In either event, the CMC is set in accordance with the table 34 database value, and the results sent to the MS 20 (steps A–C in FIG. 6), which sends the aforementioned CMCC back (steps D–F).

In a further scenario, although the interface to the ciphering table 34 database is within the BSS 25, i.e., the BSC 23 or BS 24, the BSS 25 does not act upon this information, as described above. Instead, the BSS 25 passes an indication back to the MSC 14, e.g., at location updating, so the correct cipher mode may be set. For example, the MSC 14 passes the CMC to the MS 20 (steps A–C) and returns the CMCC (steps D–f).

It should be understood that the current ciphering mode is also sent at handover request from the MSC 14 to the BSC 23. Where the table 34 is stored within the BSS 25, the target BSS will need to set the cipher mode after receiving the handover request. However, since the information, e.g., the value of the cipher mode flag 36, in the MSC 14 regarding cipher mode may be different than the cipher mode that was actually set since the cipher mode may have been modified after it left the MSC 14. Accordingly, the target BSS 25 makes the cipher decision based upon the coordinates of the last reported terminal position. Where the table is stored in the MSC 14, the cipher mode sent in the handover request is the same as the one sent in the original CMC. For the aforementioned combined solution, the cipher mode sent in the handover request is the same one as was received in the CMCC.

Figure 5:
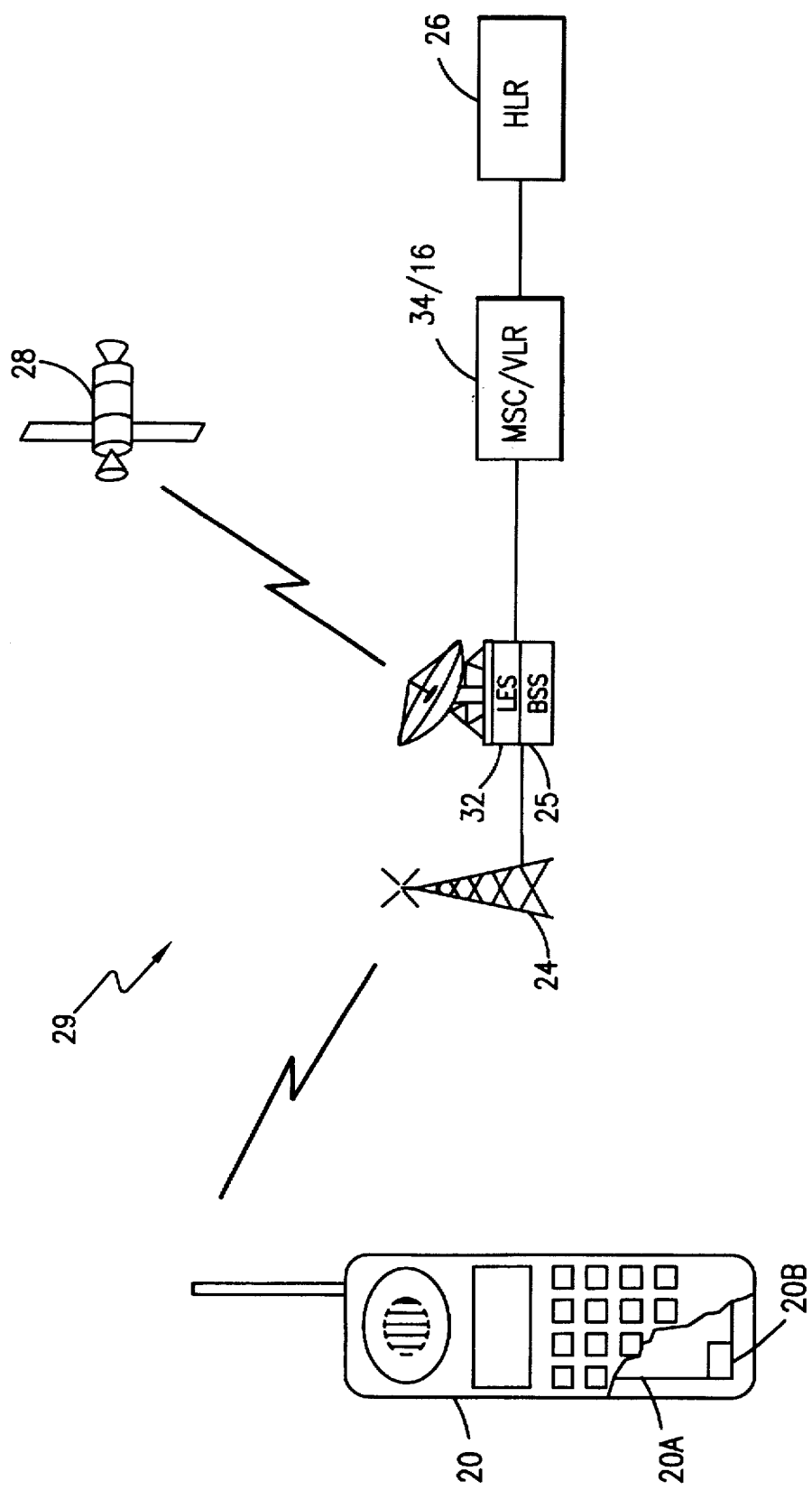
FIG. 5 is a block diagram of a system for implementing ciphering restriction in the satellite based telecommunication system also illustrated in FIG. 2.

As with the above terrestrial systems 10, the ciphering mode for transmissions in the satellite system of FIG. 5 may be set by allocating tables and procedures in the network nodes in a manner analogous to their allocation in the terrestrial cellular system.

It should also be understood that the particular indexing scheme used in forming the tabular database 34 may rely upon the standard geographical latitude/longitude designations with Greenwich, England being zero degrees longitude or may utilize alternate indices. For example, since most of the world is covered by oceans, fine positional resolutions are not necessary over such vast expanses. Since there may be a relatively few countries (or States) forbidding ciphering within their jurisdiction, portions of the table 34, i.e., a subtable, may be used instead of an entire database record representing the world or groups of geopolitical organizations, e.g., Europe. Accordingly, a subtable of the table 32 values may surround France or other such ciphering-free zone alone with a gridwork of flags, whereby the mapping function receiving the latitude, longitude coordinates of a user outside the subtable would immediately return enabled and, if within the subtable, would check the positional flag as described hereinabove. Additional subtables may be formed representing other ciphering-free countries.

Similarly, the mapping function may employ more complicated mathematical algorithms used to ascertain geopolitical boundaries. For example, each geopolitical area may be described as a polygon whose edges are borders. A signal going to a user within the polygon, e.g., one representing France, would be encryption-free, whereas a signal going to a user across the polygonal edge would incorporate encryption.

It should be understood that the aforedescribed mode flag may default to restricted encryption for systems 10 within encryption-free jurisdictions, where operation in encrypted mode requires a change in mode.

It should also be understood that, although the preferred embodiments have been described with reference to GSM specifications and protocols, the principle of the present invention are also applicable to other cellular and satellite standards.

The previous description is of a preferred embodiment for implementing the invention, and the scope of the invention should not necessarily be limited by this description. The scope of the present invention is instead defined by the following claims.

What is claimed is:

1. A telecommunications system having a mobile services center, a base station system attached thereto and a multiplicity of mobile terminals in wireless communication therewith, a plurality of said mobile terminals having ciphering capability therein for wireless ciphered communications with said base station system, circuitry within said telecommunications system for selectively restricting said ciphering capability within a plurality of restricted areas covered by said telecommunications system, said circuitry comprising:

a ciphering database containing a multiplicity of ciphering restrictions pertaining to a corresponding multiplicity of signal transceiving areas within said telecommunications system, said plurality of restricted areas being a corresponding plurality of said signal transceiving areas, a ciphering capability flag within said ciphering database being set to no ciphering for each of said restricted areas; and geographical referencing means for determining said ciphering capability of a particular signal reception area within said telecommunications system, said means accessing a particular ciphering capability flag within said ciphering database, said particular flag corresponding to said particular signal transceiving area, whereby said telecommunications system restricts the ciphering capability of a user within said particular signal transceiving area pursuant to said corresponding particular flag.

2. The telecommunications system according to claim 1, wherein said ciphering database is a tabular database and said geographical referencing means references said particular ciphering capability flag within said tabular database using indices.

3. The telecommunications system according to claim 2, wherein said indices are a pair of Cartesian coordinates, said coordinate pair referencing the particular ciphering capability flag corresponding to said particular signal transceiving area.

4. The telecommunications system according to claim 3, wherein a first of said coordinate pair represents a longitudinal coordinate and the second represents a latitudinal coordinate.

5. The telecommunications system according to claim 3, wherein each indicia of said coordinate pair is in degrees, said degrees identifying the geographical location of said particular signal transceiving area.

6. The telecommunications system according to claim 5, wherein each indicia of said coordinate pair is also in minutes, said degrees and minutes identifying the geographical location of said particular signal transceiving area.

7. The telecommunications system according to claim 6, wherein each indicia of said coordinate pair is also in seconds, said degrees, minutes and seconds identifying the geographical location of said particular signal transceiving area.

8. The telecommunications system according to claim 2, wherein said tabular database is stored within said mobile switching center.

9. The telecommunications system according to claim 8, wherein said mobile services center is a mobile satellite switching center.

10. The telecommunications system according to claim 2, wherein said tabular database is stored within said base station system.

11. The telecommunications system according to claim 10, wherein the tabular database is stored within a base station within said base station system.

12. The telecommunications system according to claim 10, wherein said base station system includes a land earth station.

13. The telecommunications system according to claim 2, wherein said tabular database is stored within a given one of said mobile terminals.

14. The telecommunications system according to claim 2, wherein said tabular database substantially covers the earth.

15. The telecommunications system according to claim 2, wherein said tabular database substantially covers at least one geopolitical jurisdiction.

16. The telecommunications system according to claim 15, wherein said tabular database covers at least one geopolitical jurisdiction allowing s aid wireless ciphered communications therein and at least one other, contiguous geopolitical jurisdiction restricting said wireless ciphered communications therein.

17. The telecommunications system according to claim 1, wherein said ciphering database is a list of ciphering capability flags.

18. The telecommunications system according to claim 17, wherein said list is stored within said mobile services center, said list containing at least one ciphering capability flag for said mobile services center.

19. The telecommunications system according to claim 18, wherein said at least one ciphering capability flag for said mobile services center corresponds to the geographical area covered by said mobile services area.

20. The telecommunications system according to claim 18, wherein said mobile services center is a mobile satellite services center.

21. The telecommunications system according to claim 18, wherein said list also contains at least one ciphering capability flag for said base station system attached to said mobile services center.

22. The telecommunications system according to claim 21, wherein said at least one ciphering capability flag for said base station system corresponds to the geographical area covered by said base station system.

23. The telecommunications system according to claim 21, wherein said base station system includes a land earth station.

24. The telecommunications system according to claim 21, wherein said list also contains a plurality for ciphering capability flags for a corresponding plurality of said mobile terminals.

25. The telecommunications system according to claim 17, wherein said list is stored within said base station system, said list containing at least one ciphering capability flag for said base station system.

26. The telecommunications system according to claim 25, wherein said at least one ciphering capability flag for said base station system corresponds to the geographical area covered by said base station system.

27. The telecommunications system according to claim 25, wherein said list also contains at least one ciphering capability flag for at least one corresponding base station attached thereto and in communication with a plurality of said mobile terminals.

28. The telecommunications system according to claim 27, wherein said at least one ciphering capability flag corresponds to the geographical area covered by said base station.

29. The telecommunications system according to claim 27, when said list also contains a plurality of ciphering capability flags for said plurality of said mobile terminals.

30. The telecommunications system according to claim 17, wherein said list is stored within at least one of said mobile terminals.

31. The telecommunications system according to claim 1, wherein said ciphering capability flag is an integer.

32. The telecommunications system according to claim 1, wherein said ciphering capability flag is a Boolean variable.

33. The telecommunications system according to claim 32, wherein said Boolean variable is part of a bit string.

34. A method for selectively restricting ciphering capability of restricted areas covered by a telecommunications system having a mobile services center, a base station system attached thereto and a multiplicity of mobile terminals in wireless communication therewith, a plurality of said mobile terminals having ciphering capability therein for wireless ciphered communication with said base station system, said method comprising the following steps:

(a) initiating a cipher mode command for a given communication of one of said mobile terminals, said given communication corresponding to a particular signal transceiving area within said telecommunications system;

(b) retrieving a ciphering capability flag from a ciphering database, said ciphering database containing a multiplicity of ciphering restrictions pertaining to a corresponding multiplicity of signal transceiving areas within said telecommunications system, said retrieved ciphering capability flag corresponding to said particular signal transceiving area; and (c) determining a ciphering mode for said given communication, said retrieved ciphering capability flag when set indicating said particular signal transceiving area is cipher restricted and said given communication is cipher-free, and said retrieved ciphering capability flag when not set indicating ciphering availability for said given communication within said particular signal transceiving area.

35. The method according to claim 34, wherein said ciphering database is a tabular database and indices are used to retrieve said ciphering capability flag from said tabular database.

36. The method according to claim 35, wherein said tabular database is stored on said mobile services center, said mobile services center initiating said cipher mode command, retrieving said ciphering capability flag and determining said ciphering mode for said given communication.

37. The method according to claim 35, wherein said tabular database is stored on said base station system, said base station system initiating said cipher mode command, retrieving said ciphering capability flag and determining said ciphering mode for said given communication.

38. The method according to claim 37, wherein said base station forwards a ciphering indication to the mobile services center which initiates the cipher mode command.

39. The method according to claim 35, wherein said tabular database is stored with said one mobile terminal, said retrieved ciphering capability flag corresponding to the geographical area covered by a base station within said base station system, said one mobile terminal being in communication with said base station.

40. The method according to claim 34, wherein said ciphering database is a list of ciphering capability flags, said retrieved ciphering capability flag being retrieved from the list.

41. The method according to claim 40, wherein said list is stored within said mobile services center, said retrieved ciphering capability flag corresponding to the geographical area covered by said mobile services center.

42. The method according to claim 40, wherein said list is stored within said base station system, said retrieved ciphering capability flag corresponding to the geographical area covered by said base station system.

43. The method according to claim 40, wherein said list is stored within said one mobile terminal, said retrieved ciphering capability flag corresponding to the geographical area covered by a base station within said base station system, said one mobile terminal being in communication with said base station.

44. The method according to claim 34, wherein step (a) is initiated by a trigger, said trigger being selected from the group consisting of:

a call to said one mobile terminal within said telecommunications system, a call from said one mobile terminal within said telecommunications system, a handover of said one mobile terminal within said telecommunication system, a handover of said one mobile terminal involving said telecommunication system a second telecommunication system, a powering-up of said one mobile terminal, and a location update of said one mobile terminal.

* * * * *

UNITED STATES PATENT AND TRADEMARK OFFICE
CERTIFICATE OF CORRECTION

PATENT NO. : 5,781,628
DATED : Jul. 14, 1998
INVENTOR(S) : Alperovich et al.

It is certified that error appears in the above-identified patent and that said Letters Patent is hereby corrected as shown below:

| | |
|---|---|
| Cover page, firm | Replace "Jenken & Gilchrist" With --Jenkens & Gilchrist-- |
| Column 3, line 40 | Replace "satellitebased" With --satellite-based-- |
| Column 6, line 24 | Replace "mode" With --be-- |
| Column 8, line 34 | Replace "Th e" With --The-- |
| Column 9, line 7 | Replace "T he" With --The-- |
| Column 9, line 13 | Replace "s aid" With --said-- |

UNITED STATES PATENT AND TRADEMARK OFFICE
CERTIFICATE OF CORRECTION

PATENT NO. : 5,781,628
DATED : Jul. 14, 1998
INVENTOR(S) : Alperovich et al.

It is certified that error appears in the above-identified patent and that said Letters Patent is hereby corrected as shown below:

Column 10, line 1      Replace "Th e"
                           With --The--

Signed and Sealed this

Twenty-third Day of March, 1999

Attest:

Q. TODD DICKINSON

*Attesting Officer*      *Acting Commissioner of Patents and Trademarks*